United States Patent [19]
Magara et al.

[11] Patent Number: 5,237,145
[45] Date of Patent: Aug. 17, 1993

[54] WIRE CUT ELECTRIC DISCHARGE MACHINING METHOD

[75] Inventors: Takuji Magara; Takeshi Iwasaki; Toshio Suzuki; Masahiro Yamamoto, all of Aichi, Japan

[73] Assignee: Mitsubishi Denki K.K., Tokyo, Japan

[21] Appl. No.: 982,410

[22] Filed: Nov. 27, 1992

Related U.S. Application Data

[63] Continuation of Ser. No. 457,788, Dec. 29, 1989, abandoned.

[51] Int. Cl.⁵ .................... B23H 7/02; B23H 7/10; B23H 7/20
[52] U.S. Cl. ................................ 219/69.12
[58] Field of Search ............... 219/69.12, 69.13, 69.16, 219/69.17; 364/474.04

[56] References Cited

U.S. PATENT DOCUMENTS

| | | | |
|---|---|---|---|
| 4,559,434 | 12/1985 | Kinoshita | 219/69.17 |
| 4,649,252 | 3/1987 | Obara | 219/69.12 |
| 4,673,787 | 6/1987 | Inoue | 219/69.12 |
| 4,803,326 | 2/1989 | Kiyoshi | 219/69.12 |

FOREIGN PATENT DOCUMENTS

| | | | |
|---|---|---|---|
| 196926 | 11/1983 | Japan | 219/69.12 |
| 61-121832 | 6/1986 | Japan | |
| 61-131824 | 6/1986 | Japan | |
| 62-208829 | 9/1987 | Japan | |
| 63-7229 | 1/1988 | Japan | 219/69.12 |
| 63-99134 | 4/1988 | Japan | |
| 63-114818 | 5/1988 | Japan | 219/69.12 |
| 63-312024 | 12/1988 | Japan | 219/69.12 |
| 64-45524 | 2/1989 | Japan | |

Primary Examiner—Geoffrey S. Evans
Attorney, Agent, or Firm—Sughrue, Mion, Zinn, Macpeak & Seas

[57] ABSTRACT

In a wire cut electric discharge machining method, feeding units having wire electrode feeding mechanisms are provided for wire electrodes different in diameter, respectively. The feeding units are moved, one at a time, to a wire electrode feeding path by cylinders coupled detachably to thereto, respectively, whereby the wire electrodes different in diameter are automatically replaced with each other, and machining conditions are automatically selected according to the diameter of a wire electrode and a machining process which are to be used. Therefore, the workpiece can be machined with the wire electrode most suitable for the given machining configuration. Thus, the method is high in machining accuracy and in machining efficiency.

4 Claims, 6 Drawing Sheets

FIG. 5

| CUT \ MACHINING PORTION | A PORTION | B PORTION |
|---|---|---|
| 1st | $d_A \cdot E_{A1} \cdot h_{A1}$ | $d_B \cdot E_{B1} \cdot h_{B1}$ |
| 2nd | $d_A \cdot E_{A2} \cdot h_{A2}$ | $d_B \cdot E_{B2} \cdot h_{B2}$ |
| 3rd | $d_A \cdot E_{A3} \cdot h_{A3}$ | $d_B \cdot E_{B3} \cdot h_{B3}$ |
| 4th | $d_A \cdot E_{A4} \cdot h_{A4}$ | $d_B \cdot E_{B4} \cdot h_{B4}$ |

FIG. 6

| CUT \ MACHINING PORTION | A PORTION | B PORTION |
|---|---|---|
| 1st | $d_A \cdot E_{A1} \cdot h_{A1} + (g_{B1} - g_{A1})$ | $d_B \cdot E_{B1} \cdot h_{B1}$ |
| 2nd | $d_B \cdot E_{B2} \cdot h_{B2}$ | |
| 3rd | $d_B \cdot E_{B3} \cdot h_{B3}$ | |
| 4th | $d_B \cdot E_{B4} \cdot h_{B4}$ | |

FIG. 7

| CUT \ MACHINING PORTION | A PORTION | B PORTION |
|---|---|---|
| 1st | $d_A \cdot E_{A1} \cdot h_{A1} + (g_{B2} - g_{A2})$ | $d_B \cdot E_{B1} \cdot h_{B1}$ |
| 2nd | $d_A \cdot E_{A2} \cdot h_{A2} + (g_{B2} - g_{A2})$ | $d_B \cdot E_{B2} \cdot h_{B2}$ |
| 3rd | $d_B \cdot E_{B3} \cdot h_{B3}$ | |
| 4th | $d_B \cdot E_{B4} \cdot h_{B4}$ | |
| 5th | $d_B \cdot E_{B5} \cdot h_{B5}$ | |

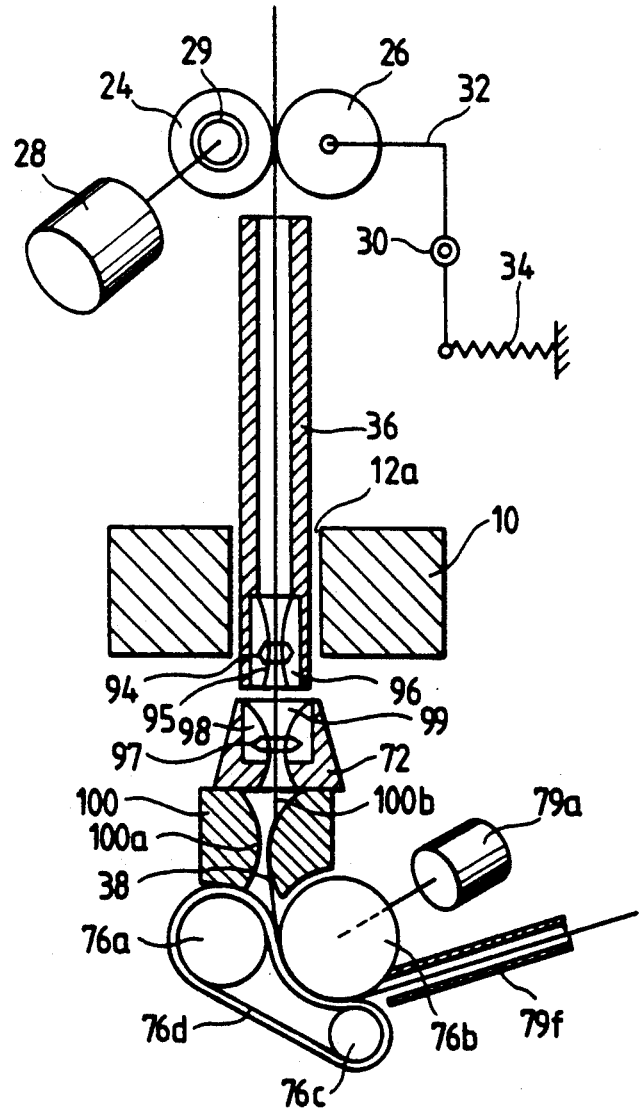

WIRE CUT ELECTRIC DISCHARGE MACHINING METHOD

This is a continuation of application Ser. No. 07/457,788, now abandoned, filed Dec. 29, 1989.

FIELD OF THE INVENTION

This invention relates to a wire cut electric discharge machining method in which wire electrodes different in diameter are automatically and selectively used to machine a workpiece.

BACKGROUND OF THE INVENTION

In general, in a wire cut electric discharge machining method, a wire electrode is confronted with a workpiece with a small gap therebetween, and a pulse discharge is caused between the workpiece and the wire electrode which is being continuously fed to the workpiece, so that the workpiece is machined with the discharge energy. FIG. 8 is a diagram showing the arrangement of an automatic wire electrode feeding device in a wire cut electric discharge machine which has been disclosed, for instance, by Japanese Patent Application (OPI) No. 80518/1985 (the term "OPI" as used herein means an "unexamined published application"). In FIG. 8, reference numeral 10 designates a workpiece to be machined which is mounted on an X-Y cross table (not shown) which is movable in a horizontal plane; 12a and 12b, machining start holes which are formed on a surface of the workpiece 10 in advance; 14, a guide supporting the wire electrode feeding device, the guide 14 being fixedly mounted on a shaft which is movable in the Z-axis direction of the wire cut electric discharge machine body (not shown); i.e., in a vertical direction; and 16, a slider forming a part of a moving mechanism 17, the slider 16 being slidable vertically along the guide 14. The slider 16 is engaged with a drive screw 18, the upper end portion of which is coupled to a drive motor 20 fixedly mounted on the upper portion of the guide 14, so that the slider 16 is automatically slid on the guide 14 by means of the drive screw 18 and the drive motor 20. A roller mechanism 22 is mounted on the slider 16. The roller mechanism 22 comprises a pair of pulleys, namely, a wire electrode feeding pulley 24 and a clamp pulley 26. The rotary shaft of the wire electrode feeding pulley 24 is coupled to a wire electrode feeding motor 28 which is fixed to the slider 16. The pulley 24 has a reverse rotation preventing mechanism 29. The clamp pulley 26 is rotatably supported on the end portion of a link 32 which is rotatably mounted on a pin 30 embedded in the slider 16. The rear end portion of the link 32 is coupled to the slider 16 through a coil spring 34, so that the clamp pulley 26 at the end of the link 32 is kept pushed against the wire electrode feeding pulley 24 by the elastic force of the coil spring 34.

Further in FIG. 8, reference numeral 36 designates a pipe guide (for instance 2 to 3 mm in outside diameter) into which a wire electrode 38 is inserted so as to be supported thereby. The upper end portion of the pipe guide 36 is secured through a mounting member 40 to the slider 16 forming the moving mechanism 17. A power source guide for slidably supporting the wire electrode 38 is fitted in the lower end portion of the pipe guide 36. A predetermined voltage is applied across the pipe guide 36 and the workpiece 10. When the pipe guide 36 is brought into contact with the workpiece 10, a detector 91 outputs a detection signal. In response to the signal, the drive motor 20 is stopped, and the wire electrode feeding motor 28 is driven, so that the wire electrode 38 is fed through the pipe guide 36. A clamp mechanism 42 is provided at the lower end portion of the guide 14, to fixedly support the pipe guide 36 at a predetermined position. The clamp mechanism 42 comprises: a clamp board 44a, fixedly mounted on the lower end portion of the guide 14, the clamp board 44a having a V-groove; and a clamp board 44b coupled to a solenoid 46 which is fixedly mounted on the guide 14. Upon energization of the solenoid 46, the clamp board 44b is moved away from the clamp board 44a; that is, the clamp state is eliminated; that is, the pipe guide is released. When the solenoid is deenergized, the clamp board 44b is moved towards the clamp board 44a by the elastic force of a coil spring 48 which is interposed between the solenoid 46 and the clamp board 44b, so that the pipe guide is clamped again.

Further in FIG. 8, reference numeral 50 designates a cutting mechanism which operates to cut a wire electrode at a predetermined point, and remove the waste; and 52, an arm of the cutting mechanism body. The arm 52 is fixedly connected to the rotary shaft of a drive motor 54 secured to the side wall of the guide, so that the arm 52 is swung by the drive motor 54 in a horizontal plane. A rod 56 is provided inside the arm 52 in such a manner that it is slidable on the arm 52. A solenoid 58 is fixedly mounted on the arm 52. A link 62 is swingably mounted on a pin 60 embedded in the arm 52. When the solenoid 58 is energized, the rod 56 is moved towards the front end of the arm 52 through the link 62. A coil spring 64 is interposed between the rear end of the rod 56 and the side wall of the arm 52, so that, when the solenoid 58 is deenergized, the rod 56 is slid towards the rear end of the arm by the restoring of the coil spring 64. An edge 66 and a clamp pin 68 are fixedly secured to the front end face of the rod 56. The rod 56 is moved towards the front end of the arm 51, so that the wire electrode 38 inserted between the end face of the rod 56 and the inner side wall of the of the arm 52 is held with the clamp pin 68, and cut with the edge 66. A coil spring 70 is held between the clamp pin 68 and the end face of the rod 56 so as to suitably urge the clamp pin 68.

Further in FIG. 8, reference numeral 72 designates a lower electrode guide which is so positioned as to confront through the workpiece 10 to the electrode guide in the pipe guide 36. The lower electrode guide 72 supports the wire electrode 38 in position which is slidably inserted in it. A winding mechanism 74 is provided below the lower electrode guide 72. The winding mechanism 74 operates to wind the end portion of the wire electrode 38 which has been fed through the workpiece 10, and to wind the waste wire electrode broken off thereby to remove it from the workpiece. An electric feeder 100 is provided between the inlet of the winding mechanism 74 and the lower electrode guide 72, to supply current to the wire electrode 38. The electric feeder 100 and the workpiece 10 are connected to a machining electric power source 101. The winding mechanism 74 comprises three rollers 76a, 76b and 76c, and an endless belt 76d laid over the rollers 76a and 76c in such a manner that the three rollers are abutted against one another through the endless belt 76d. The rotary shaft of the roller 76b is coupled through rollers 79a and 79b and an endless belt 79c laid over the latter to a winding motor 76 and to a winding roller 79d. The winding roller 79d is abutted against a roller 79e. A guide pipe 79f is disposed between the winding sections.

A voltage (93) is applied across the roller 79e and the wire electrode 38 above the pipe guide 36. When current flows therebetween, a detector 92 outputs a detection signal.

A tensioning mechanism 80 is provided above the guide 14, to prevent the slackening of the wire electrode 38; i.e., to tension the wire electrode as required at all times. The tensioning mechanism 80 comprises: a bobbin 82 on which the wire electrode 38 has been wound; and a torque motor 84 which rotates in the opposite direction to the direction of supply of the wire electrode 38 thereby to prevent the wire electrode from coming off the bobbin. That is, the torque motor 84 gives a certain resiliency to the bobbin 82 against the feeding of the wire electrode 38.

FIG. 9 is an enlarged sectional view showing a part of the wire electrode feeding device thus constructed in which the wire electrode is fed penetrating the workpiece. In FIG. 9, those components which have been already described with reference to FIG. 8 are therefore designated by the same reference numerals.

Further in FIG. 9, reference numeral 94 designates the aforementioned electrode guide fitted in the end portion of the pipe guide 36. The electrode guide is so designed that a die-shaped guide 95 made of diamond is fitted in the pipe guide 36 through a sintered metal part. The lower electrode guide 72 located below the workpiece 10 comprises a die-shaped guide 97 made of diamond which is fixedly supported on a sintered metal part 98. The lower electrode guide 72 has a wire introducing part 99 in the form of a funnel which is extended to the die-shaped guide 97. The diameter of the inlet of the wire introducing part 99 is larger than the outside diameter of the pipe guide 36. The center of the lower electrode guide 72 and the inlet of the winding mechanism; i.e., the contact surface of the roller 76b and the endless belt 76d are substantially coaxial positioned. The electric feeder 100 is so positioned that its inner surface which contacts the wire electrode 38 is shifted (for instance 0.5 to 3 mm) from the axis of the lower electrode guide. The electric feeder 100 has a wire electrode introducing part in the form of a funnel the diameter of which is larger than that of the outlet of the lower electrode guide 72.

With the wire cut electric discharge machine thus constructed, the wire electrode 38 is automatically inserted into the machining start holes 12a and 12b formed in the workpiece 10 as follows: The pipe guide 36 is moved relative to the workpiece 10 until it is in alignment with the hole 12a for instance. Under this condition, the solenoid 46 is operated to release the clamping mechanism 42 thereby to release the pipe guide 36. Thereafter, the drive motor 20 is operated to lift the slider 16 along the guide 14 so that the pipe guide 36 is lifted to the top of the guide 14. Under this condition, the roller mechanism 22 of the slider 16 is operated to feed the wire electrode in the pipe guide 36 until the end portion of the wire electrode appears from the lower end of the pipe guide 36 to a desirable length. The drive motor 54 of the cutting mechanism 50 is operated to turn the arm 52 180° towards the wire electrode 38, and the solenoid 58 is energized so that the wire electrode 38 is cut with the edge 66 provided at the end of the rod 56 in such a manner that the wire electrode 38 remains a predetermined length (for instance 3 to 10 mm) from the lower end of the pipe guide 36. With the waste wire electrode clamped with the clamp pin 68 provided at the end of the rod 56, the drive motor 54 is operated to return the arm 52 to the original position. Under this condition, the clamp pin 68 is released to remove the waste wire electrode cut off. Thereafter, the drive motor 20 located above the guide 14 is operated to move the slider 16 down the guide 14. If, in this case, the diameter of the hole 12a of the workpiece 10 is larger than the outside diameter of the pipe guide 36 secured to the slider 16, then the pipe guide 36 is inserted into the hole 12a to come before the electrode guide 72 located below the workpiece, as shown in FIG. 9. When the diameter of the hole 12a is smaller than the outside diameter of the pipe guide 36, the pipe guide 36 is moved downwardly until it contacts the workpiece 20 and the detector 92 operates. Thereafter, the roller mechanism 22 on the slider 16 is operated to feed the wire electrode 38 in the pipe guide 36. Thus, the wire electrode is inserted into the electrode guide 95 and the lower electrode guide 72. The end portion of the wire electrode thus inserted, being guided by the wire electrode introducing part 100b of the electric feeder 100, reaches the winding mechanism 74, where it is wound. When the wire electrode 38 reaches the rollers 79d and 79e, the detector 92 operates to stop the roller mechanism 22 and the winding mechanism 74, and to activate the drive motor 20. As a result, the slider 16 is moved up the guide 14, so that the pipe guide 36 is disengaged from the workpiece 10. When the pipe guide thus disengaged comes to a predetermined position, the solenoid is restored so that the lower end portion of the pipe guide 36 is secured to the guide 14 with the clamping mechanism 42 at the lower end of the guide 14. Thus, the wire electrode 38 has been automatically fed and inserted into the machining start hole of the workpiece. Now, electric current can be positively applied to the wire electrode 38 any time.

Now, in the case where an abnormal condition takes place during machining to break the wire electrode, an operation of automatically feeding the wire electrode again will be described.

When the wire electrode 38 is broken, the reverse rotation preventing mechanism 29 of the roller mechanism 22 on the slider 16 operates so that the wire electrode 38 is maintained in the pipe guide 36 although the tensioning mechanism 80 above the guide 14 acts on the wire electrode; that is, the wire electrode is held clamped by the roller mechanism 22. Accordingly, the wire electrode 38 between the bobbin 82 and the pipe guide 36 is maintained stopped, and the rotation of a rotation detector 86 is stopped, thus indicating the breakage of the wire electrode 38. In this case, the clamping mechanism 42 at the lower end of the guide 14 is operated to release the pipe guide 36, and the drive motor 20 is operated to lift the pipe guide 36 to the top of the guide 14. The waste wire electrode broken off is removed from the workpiece by operating the winding mechanism 74. Thereafter, the pipe guide 36 is moved relative to the workpiece 10 until it is in alignment with the machining start hole 12a of the workpiece 10. Under this condition, the wire electrode feeding device is operated according to the above-described method of inserting a wire electrode into a machining start hole of a workpiece; that is, the wire electrode 38 is automatically caused to penetrate the workpiece 10 through the hole 12a. Then, the wire electrode 38 is moved along the machining locus formed on the workpiece to the point where the wire electrode was broken, and the electric discharge machining operation is started again. The above-described movement of the wire electrode 38 relative to the workpiece 10 is automatically carried out by a CNC (computerized numerical control) unit (not shown) provided for the wire cut electric discharge machine.

The conventional wire cut electric discharge machining method is as described above. Therefore, when it is required to change the diameter of the wire electrode according to the change in machining condition or machining configuration, the operator must manually replace the bobbin 82 on which the wire electrode 38 is wound, and the wire guides 95 and 97, taking a lot of labor and time. Furthermore, it is impossible to change the wire electrode during machining, and therefore in the case of a workpiece which should be machined to have corners small in radius, a wire electrode 38 small in diameter must be used throughout the machining operation, with the result that the machining time is increased as much.

SUMMARY OF THE INVENTION

Accordingly, an object of this invention is to eliminate the above-described difficulties accompanying a conventional wire cut electric discharge machining method. More specifically, an object of the invention is to provide a wire cut electric discharge machining method in which a wire electrode can be automatically replaced with one different in diameter therefrom, and machining conditions are selected according to a wire electrode diameter to perform an electric discharge machining operation.

In a wire cut electric discharge machining method, according to the invention, a brake roller for tensioning a wire electrode, and a wire electrode feeding unit are provided for each of wire electrodes different in diameter, cylinders are detachably coupled to the feeding units, respectively, the cylinder being operated to mount the feeding units on a slider one at a time, and the slider is moved vertically along a wire electrode feeding path with the feeding unit mounted thereon; and in machining a workpiece by causing electric discharge, the wire electrodes different in diameters are automatically replaced with each other, and machining conditions are automatically selected from data tables containing machining conditions and amounts of offset predetermined for wire electrode diameters and machining processes.

BRIEF DESCRIPTION OF THE DRAWINGS

FIGS. 5, 6 and 7 are tables for a description of examples of a machining process according to the invention.

FIG. 9 is a sectional diagram showing essential components of the device illustrated in FIG. 8.

DETAILED DESCRIPTION OF THE PREFERRED EMBODIMENT OF THE INVENTION

One preferred embodiment of this invention will be described with reference to the accompanying drawings.

Figure 1:
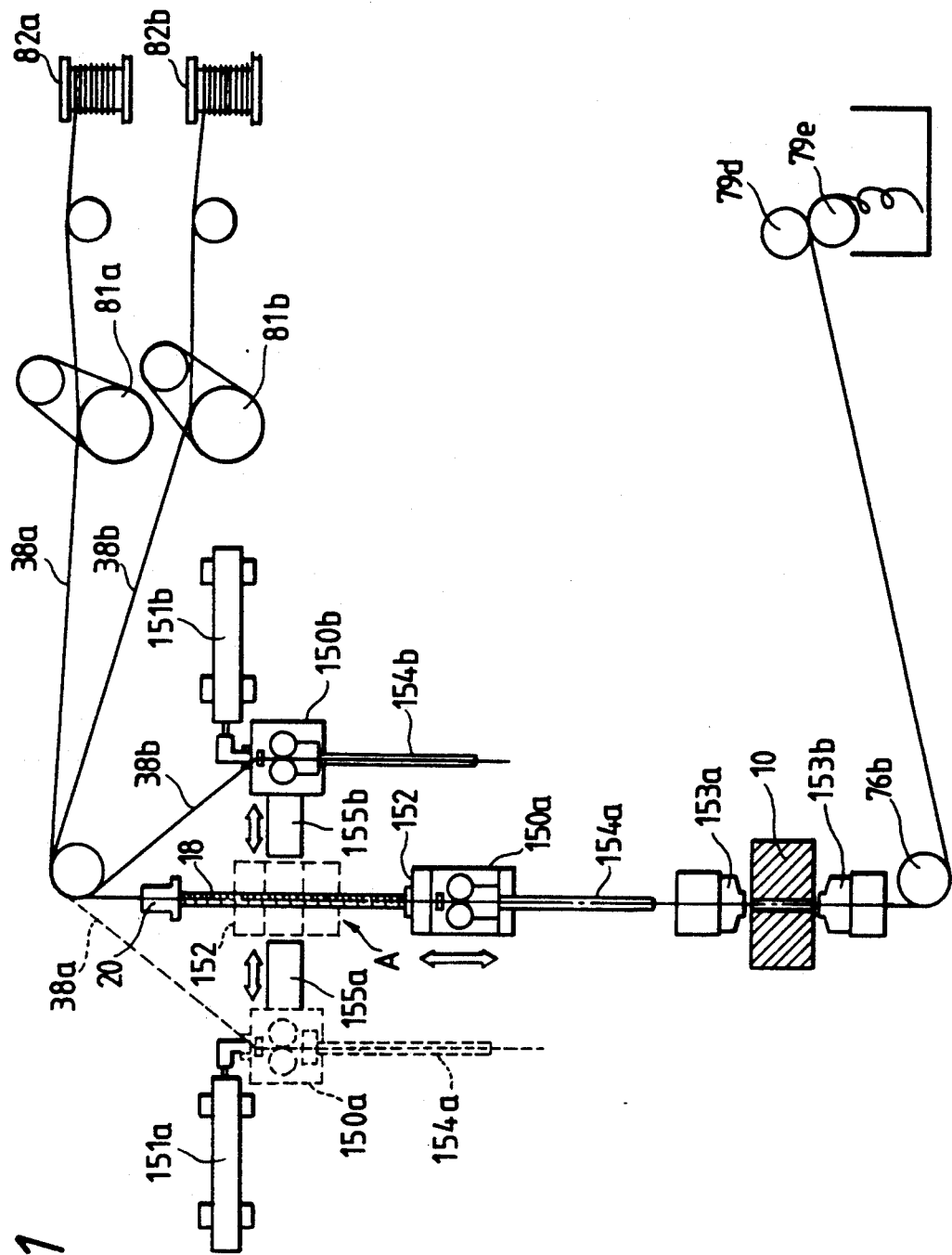
FIG. 1 is an explanatory diagram showing the arrangement of a machining apparatus which practices one example of a wire cut electric discharge machining method according to the invention.

FIG. 1 is an explanatory diagram showing a wire electrode feeding path in a wire cut electric discharge machining method according to the invention. In FIG. 1, reference numeral 10 designates a workpiece to be machined; 38a, a first wire electrode 0.2 mm in diameter for instance; 38b, a second wire electrode 0.1 mm in diameter for instance; 82a, a first bobbin on which the first wire electrode 38a is wound; 82b, a second bobbin on which the second wire electrode 38b is wound; 81a, a first brake roller for tensioning the first wire electrode 38a; 81b, a second brake roller for tensioning the second wire electrode 38b; 150a, a first wire electrode feeding unit for feeding the first wire electrode 38a; 150b, a second wire electrode feeding unit for feeding the second wire electrode 38b; 152, a slider which is moved vertically together with the feeding unit 150a or 150b; 20, an electric motor for moving the slide 152 with the aid of a feed screw 18; 151a, a first air cylinder for mounting the first wire electrode feeding unit 150a on the slider 152, and dismounting it from the slider 152; 151b, a second air cylinder for mounting the second wire electrode feeding unit 150b on the slider 152, and demounting it from the slider 152; 155a, a first guide rail for mounting the feeding unit 150a on the slider 152, and demounting it therefrom; 155b, a second guide rail for mounting the feeding unit 150b on the slider 152, and demounting it therefrom; 154a and 154b, first and second guide pipes secured to the feeding units 150a and 150b, for guiding the wire electrodes 38a and 38b, respectively; 153a, an upper guide unit; and 153b, a lower guide unit.

Figure 2:
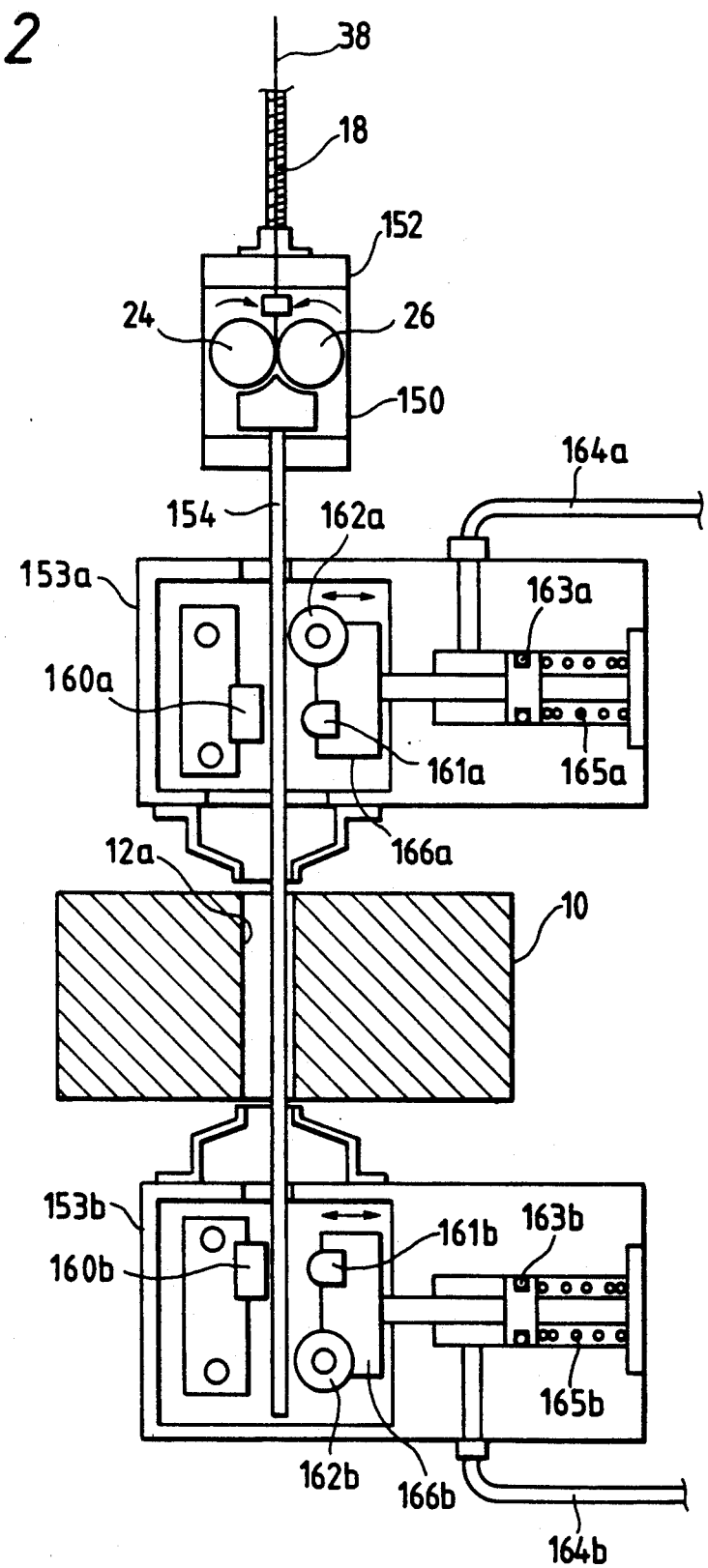
FIG. 2 is a sectional view showing essential components of the machining apparatus shown in FIG. 1.

FIG. 2 is a sectional view showing the upper guide unit 153a and the lower guide unit 153b in more detail. In FIG. 2, reference numerals 160a and 160b, guides V-shaped in section; 161a and 161b, retaining guides; 162a and 162b, electric for feeders for supplying electric current to the retaining guides 161a and 161b and the wire electrode; 166a and 166b, blocks fixing the electric feeders 162a and 162b, respectively; 163a and 163b, air cylinders for moving the blocks 166a and 166b away from the guides 160a and 160b, respectively; 164a and 164b, air pipes for supplying driving air to the air cylinders 163a and 163b, respectively; and 165a and 165b, compression springs for moving the blocks 166a and 166b towards the guides 160a and 160b, respectively.

Now, an operation of automatically switching wire electrodes different in diameter over to each other will be described with reference to FIG. 1.

In the invention, two wire electrodes, namely, the abovedescribed first wire electrode 38a 0.2 mm in diameter and second wire electrode 38b 0.1 mm in diameter are used. The first and second wire electrodes 38a and 38b have been set on the first and second wire electrode feeding units 150a and 150b, respectively. The first wire electrode feeding unit 150a and the second wire electrode feeding unit 150b (indicated by the dotted line) are positioned symmetrically respect to each other as shown in FIG. 1, being coupled to the driving parts of the first and second air cylinders 151a and 151b, respectively. Under this condition, the first wire electrode 38a 0.2 mm in diameter is handled as follows: First, the electric motor 20 is operated to drive the feed screw 18 thereby to lift the slide 152 to the position A indicated by the dotted line. Under this condition, the air cylinder 151a is driven, so that the feeding unit 150a is moved on the guide rail 155a, and fixedly mounted on the slider 152 at the position A. The slider 152 together with the feeding unit 150a is moved downwardly to the predetermined position (indicated by the solid line) by the motor 20 with the aid of the feed screw 18, and the driving part of the air cylinder 151a is returned to the original position, as shown in FIG. 1. Under this condition, the wire electrode 38a 0.2 mm in diameter is fed.

The first wire electrode 38a 0.2 mm in diameter is replaced with the second wire electrode 38b 0.1 mm in diameter as follows: First, the driving part of the first air cylinder 151a for the first wire electrode is moved to the predetermined position in the direction of axis of the wire electrode 38a, and then the motor 20 is operated to drive the feed screw 18 thereby to lift the slider 152 to the position A as shown in FIG. 1. In this operation, the first wire electrode (0.2 mm in diameter) feeding unit 150a is engaged with the driving part of the air cylinder 151a. Thereafter, the air cylinder 151a is operated to return the driving part to the original position, so that the first wire electrode (0.2 mm in diameter) feeding unit 150a is disengaged from the slider 152, and is held at the position (indicated by the dotted line). Thereafter, the driving part of the second air cylinder 151b engaged with the second wire electrode feeding unit 150b is moved to the predetermined position in the direction of axis, so that the second wire electrode feeding unit 150b is fixedly mounted on the slider 152 which is positioned where it has been disengaged from the first wire electrode feeding unit 150a. Under this condition, the motor 20 is operated to move the slider 152 downwardly to the predetermined position with the aid of the feed screw 18. The feeding unit 150b is held at the predetermined position, and the driving part of the second air cylinder 151b is returned to the original position. Thus, the first wire electrode 38a 0.2 mm in diameter has been replaced with the second wire electrode 38b 0.1 mm in diameter. In the invention, the first and second brake rollers 81a and 81b independent from each other are provided for the first and second wire electrodes, respectively. Therefore, whichever wire electrode is used, it can be tensioned suitably.

An operation of feeding the wire electrode which has been selected and set as described above will be described. As shown in FIG. 2, the upper guide unit 153a comprises: the guide 160a V-shaped in section; and the block 166a fixing the electric feeder 162a and the retaining guide 161a which confronts the guide 160a. Similarly, the lower guide unit 153b comprises the guide 160b U-shaped in section and the block 166b fixing the electric feeder 162a and the retaining guide 161b which confronts the guide 160b. In an automatic wire electrode feeding operation, the air cylinders 163a and 163b are moved against the elastic forces of the compression springs 165a and 165b by the driving air supplied through the air pipes 164a and 164b, so that the blocks 166a and 166b are moved away from the guides 160a and 160b, respectively. Under this condition, the slider 152 moves downwardly from the predetermined position, so that the guide pipe 154 is inserted through the upper guide unit 153a and the machining start hole 12a of the workpiece 10 into the lower guide unit 153b. Thereafter, in the feeding unit 150, two pulleys 24 and 26 are driven to feed the wire electrode 38 through the guide pipe 154. After the wire electrode 38 reaches a wire electrode take-up unit comprising the rollers 79a through 79e, the slider 152 is returned to the original position, and accordingly the guide pipe 154 is also moved upwardly. Thereafter, the supply of driving air through the air pipes 164a and 164b is suspended, so that the blocks 166a and 166b are moved towards the blocks 160a and 160b by the elastic forces of the compression springs 165a and 165b, respectively. As a result, the wire electrode 38 is fixedly pushed by the retaining guides 161a and 161b against the guides 160a and 160b. Thus, the feeding of the wire electrode 38 has been accomplished, and the machining operation can be started. The above-described operations are carried out in response to instructions from the NC device (not shown); that is, a so-called "programmed operation" can be performed. In other words, the replacement of the wire electrode and the machining of the workpiece are automatically achieved. In the above-described embodiment, the cylinders 151a, 151b, 163a and 163b are operated by compressed air; however, it goes without saying that they may be operated with hydraulic pressure or other fluids.

Figure 3:
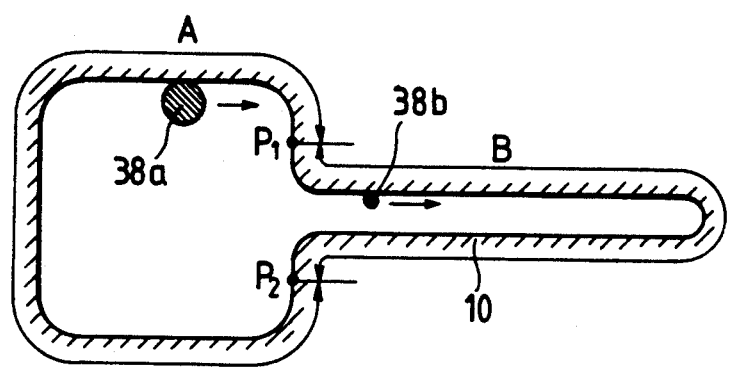
FIGS. 3 and 4 are explanatory diagrams showing one example of a machining operation performed according to the method of the invention.
Figure 4:
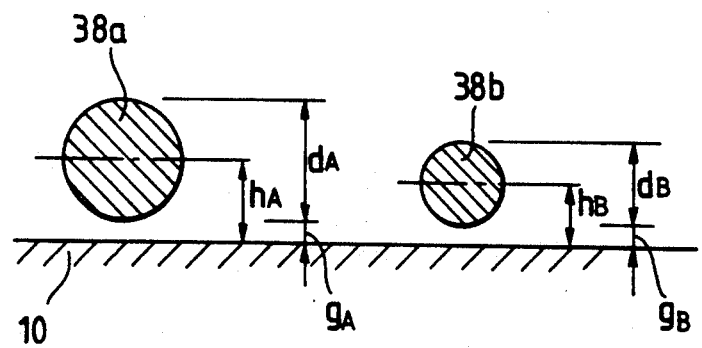
Figure 8:
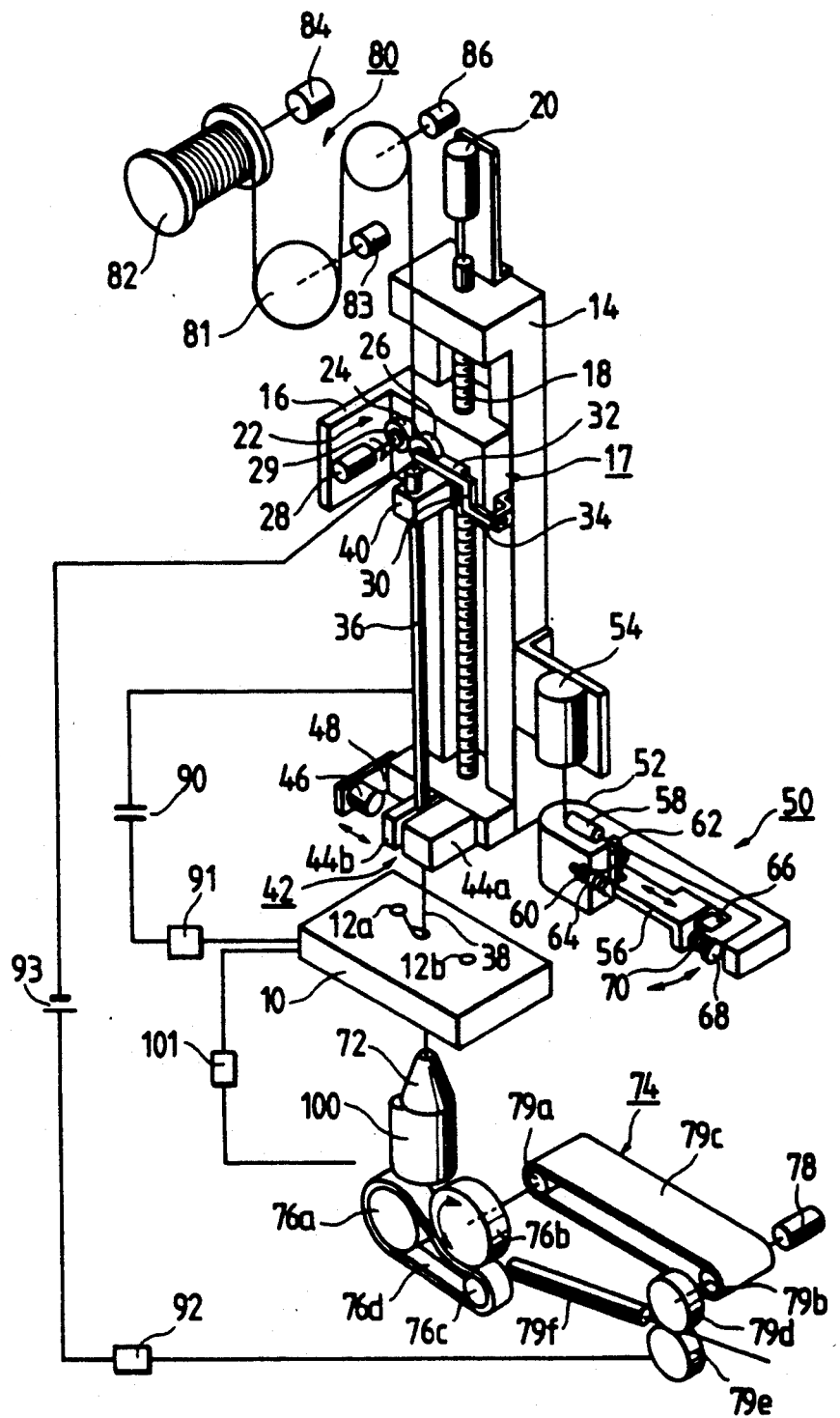
FIG. 8 is an explanatory diagram showing the arrangement of a conventional wire electrode feeding device.

A method of machining a workpiece with a wire cut electric discharge machine having the above-described automatic wire electrode replacing device will be described with reference to the case where the workpiece is machined as shown in FIG. 3. As is apparent from FIG. 3, the workpiece can be machined with high efficiency by using the first wire electrode 38a (0.2 mm in diameter) of the region A, and the second wire electrode 38b (0.1 mm in diameter) for the region B. FIGS. 5, 6 and 7 are tables indicating machining patterns of from a rough machining operation (the first cut) to a finish machining operation (the n-th cut). In FIGS. 5, 6 and 7, $d_A$ is 0.2 which is the diameter of the first wire electrode 38a 0.2 mm in diameter; $d_B$ is 0.1 which is the diameter of the second wire electrode 38b 0.1 mm in diameter; $E_A$ and $E_B$ are machining conditions with respect to the first and second electrodes, which are provided for machining steps $E_{A1}$ through $E_{An}$ and $E_{B1}$ through $E_{Bn}$, respectively; $h_A$ and $h_B$, as shown in FIG. 4, are the amounts of offset with respect to the first and second wire electrodes, respectively, which are also provided for machining steps $h_{A1}$ through $h_{An}$ and $h_{B1}$ through $h_{Bn}$, respectively; and $g_A$ and $g_B$ are the machining gaps provided for the first and second wire electrodes as shown in FIG. 4, which are different in the machining steps.

Now, the machining patterns shown in FIGS. 5, 6 and 7 will be described. The machining conditions $E_A$ and $E_B$, and the amounts of offset $h_A$ and $h_B$ in the machining steps (the first through the fourth or fifth cuts) have been stored, as data tables provided separately according to the first and second wire electrodes, in the NC device (not shown), and they are selectively read out according to a given NC program. In FIGS. 5, 6 and 7, the arrows indicate the machining order. For instance in the case where with the machining pattern of FIG. 5 a workpiece is machined as shown in FIG. 3, for the region A the first through fourth cuts are carried out with the first wire electrode 38a 0.2 mm in diameter, and then for the region A the first through fourth cuts are carried out with the second wire electrode 0.1 mm in diameter. In the machining operation, the machining conditions and the amounts of offset are selected read out of the data tables in the NC device according to the machining steps. FIG. 6 is for the case where only the first cuts for the regions A and B are carried out with the different wire electrodes; more specifically, for the region A the first cut is performed with the first wire electrode 38a 0.2 mm in diameter, and thereafter for the region B the first cut is performed with the second wire electrode 38b 0.1 mm in diameter, and for both the regions A and B the second through fourth cuts carried out with the second wire electrode 38b 0.1 mm in diameter. In other words, the first cut of the region A is performed with the first wire electrode 0.2 mm in diameter thereby to decrease the rough machining time, and the finish machining operation (the second through fourth cuts) in which the machining speed does not depend on the wire electrode diameter is achieved with the second wire electrode 0.1 mm in diameter. Since the second through fourth cuts are performed with the wire electrode 0.1 mm in diameter only, the amount of offset $h_{A1}$ of the first cut must be corrected by the difference between the machining gaps $g_A$ and $G_B$ of the first and second wire electrodes (0.2 mm and 0.1 mm in diameter). That is, it is unnecessary to make any steps in the surface for which the first cut has been carried out. This requirement can be achieved by storing in data tables in the NC device the gaps which are determined from wire electrode data and the combination of wire electrode diameters. In the case of FIG. 7, after the first and second cuts of the region A are carried out with the first wire electrode 38a 0.2 mm in diameter, and then the first wire electrode 38a is replaced with the second wire electrode 38b 0.1 mm in diameter to achieve the first and second cuts of the region B, thereafter the third through fifth cuts of both of the regions A and B are carried out with the same second wire electrode 38b. In this case, when the second cut of the region A has been accomplished, no step should be formed in the machined surface. This requirement can be met by adding the difference between the machining gaps ($g_{B2}-g_{A2}$) in the second cut as data to correct the amount of offset. As was described above, the machining conditions and amounts of offset provided for the wire electrodes and the machining steps are selectively read out of the data tables stored in the NC device, according to the NC program.

As apparent from the above description, according to the invention, wire electrodes different in diameter are automatically replaced with each other according to the machining configuration, and machining process, and machining conditions suitable for the diameter of a wire electrode to be used are selected to machine the workpiece. Therefore, a workpiece can be machined with the wire electrode most suitable for the machining configuration. Thus, the wire cut electric discharge machining method of the invention is high both in machining accuracy and in machining efficiency.

POSSIBILITY FOR THE INDUSTRIAL USE

The present invention can be widely used in a wire electric discharge machining apparatus for machining a workpiece, for example a metal.

What is claimed is:

1. A wire cut electric discharge machining method, comprising:
    providing a feeding unit comprising a wire electrode feeding mechanism and a guide into which a wire electrode is inserted for each of a plurality of wire electrodes different in diameter,
    positioning a selected wire electrode in a machining location,
    machining a workpiece by causing electric discharge in a small gap formed between said workpiece and said wire electrode,
    automatically replacing a first wire electrode having a first diameter with a second wire electrode having a second diameter according to machining configurations and machining processes to be performed, and
    according to a diameter of the replacement wire electrode and said machining processes which are to be performed, automatically selecting machining conditions from data tables containing machining conditions and amounts of offset predetermined for wire electrode diameters and machining processes, wherein said machining conditions and the amount of offset are automatically changed in association with each other, and
    wherein said amounts of offset account for a radius of said wire electrode and a gap between said wire electrode and said workpiece to be machined.

2. The wire cut electric discharge machining method according to claim 1, wherein said machining conditions and said amounts of offset in steps of said machining processes are stored, and are selectively read-out according to a predetermined program.

3. A wire cut electric discharge machining method comprising:
    providing a feeding unit comprising a wire electrode feeding mechanism and a guide into which a wire electrode is inserted for each of a plurality of wire electrodes different in their diameter,
    positioning a selected wire electrode in a machining location,
    machining a workpiece by causing electric discharge in a small gap formed between said workpiece and said wire electrode,
    automatically replacing a first wire electrode having a first diameter with a second wire electrode having a second diameter according to machining configurations and machining processes to be performed, and
    according to a diameter of the replacement wire electrode and said machining processes which are to be performed, automatically selecting machining conditions from data tables containing machining conditions and amounts of offset predetermined for wire electrode diameters and machining processes, wherein said machining conditions and the amount of offset are automatically changed in association with each other,
    wherein said amounts of offset account for a gap between said wire electrode and a surface of said workpiece to be machined.

4. A wire electrode discharge machining apparatus adapted to be controlled by a numerical control unit including data tables, comprising:
    a first wire electrode having a first diameter;
    a first feeding unit including a first wire electrode feeding mechanism and a first guide into which said first wire electrode is inserted;
    a second wire electrode having a second diameter;
    a second feeding unit including a second wire electrode feeding mechanism and a second guide into which said second wire electrode is inserted;
    a mounting unit for selectively mounting one of said first and second feeding units;
    means for automatically replacing said first and second wire electrodes with each other according to a machining configuration and machining processes to be performed; and means for automatically selecting machining conditions from said data tables of said numerical control unit based on a diameter of the respective wire electrode, said data tables containing machining conditions and amounts of offset predetermined for a plurality of wire electrode diameters and machining processes, wherein said selecting means comprises means for automatically changing machining conditions and the amount of offset in association with each other, and wherein said amounts of offset account for a radius of said wire electrode and a gap between said wire electrode and said workpiece to be machined.

* * * * *